2,631,660

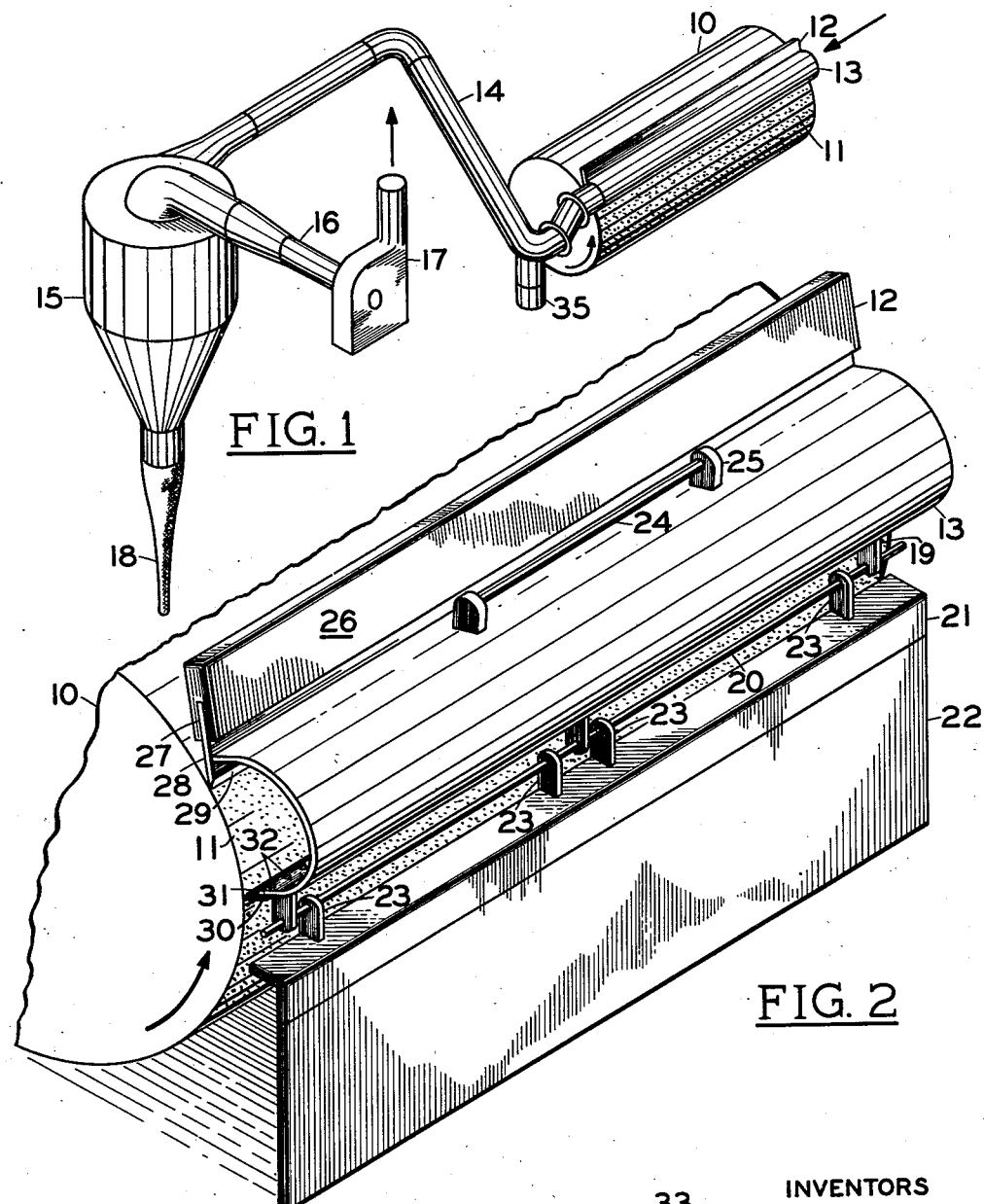
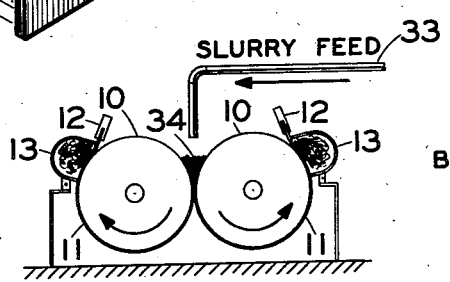
March 17, 1953    E. B. CHISWELL ET AL    2,631,660
PNEUMATIC CONVEYING SYSTEM
Filed May 12, 1949
FIG. 1
FIG. 2
FIG. 3
SLURRY FEED
INVENTORS
Edgar B. Chiswell
Harold W. Gaunce
ATTORNEYS Patented Mar. 17, 1953

UNITED STATES PATENT OFFICE 2,631,660

PNEUMATIC CONVEYING SYSTEM

Edgar B. Chiswell, Berkeley, and Harold W. Gaunce, El Cerrito, Calif., assignors to California Research Corporation, San Francisco, Calif., a corporation of Delaware Application May 12, 1949, Serial No. 92,766

1 Claim. (Cl. 159—10)

The present invention relates to pneumatic conveying systems, and more particularly to pneumatic conveying systems for solidified material which has been deposited as a layer upon a rotating drum and is subsequently removed in a powdered, granulated, or flaky condition.

Heretofore, in the drum-drying art, by which term we mean to indicate any material handling process wherein fluidized material is deposited upon a drum and solidified by either subtracting or adding heat, as well as processes wherein the material is work-hardened upon the surface of the drum, it has been common to provide scraping means or other means for removing the solidified, or hardened, material from the surface of the drum and separate conveying means for carrying away the desired material by either a continuous screw arrangement or a continuous belt arrangement. In the prior art systems pneumatic, or air-exhaust means, have been provided in the vicinity of the scraper, or removing means, for the sole purpose of carrying away undesired dust or dirt particles from the finished product.

It has also been suggested that the scraping means be replaced with a pneumatic, or vacuum, type of pick-up working on the principle of a household vacuum cleaner. Previous apparatus of this type has always employed a flow of air through an elongated opening in a pick-up tube arranged substantially tangential to the surface of the drum with a single exhaust pumping means providing an air flow tangential to the drum. Except in those applications where the drum is quite narrow axially, great difficulty has been encountered in obtaining an even flow of air across the width of the drum, since the inherent operation of such apparatus is for a much greater pressure differential to exist near the center of the pick-up opening than at the extended edges of the pick-up device. Under these conditions the total flow of air required to pick up material from the center of the drum is insufficient to pick up material from the cylindrical face of the drum near its ends. On the other hand, if sufficient power is supplied to pick up material from the extended ends, the over-all efficiency and cost of operation is much greater, since a greatly enlarged blower capacity is required to operates the system.

It is an object of the invention to provide a pneumatic conveying system capable of carrying more material for a given quantity of air passing through the system than heretofore, and thereby provide a more efficient and economically cheaper method of pneumatic conveying.

A further object of the invention is to provide a pneumatic conveying system for drum-dried or deposited material removed from the drum in the presence of the air stream flowing axially along the surface of the drum and borne wholly by the air stream.

Further objects and advantages of the present invention will be apparent from the following description taken in conjunction with the drawings.

In the drawing:

Fig. 1 shows a schematic representation of a complete pneumatic conveying system constructed in accordance with the present invention.

Fig. 2 is a detailed view, partially in section, of a pick-up tube and scraping means in cooperative relation with drum-drying apparatus, which may be used in the system shown in Fig. 1.

Fig. 3 is a schematic end view of a parallel pair of drums arranged to dry a slurry material for introduction into a conveying system constructed in accordance with the invention.

With reference to the drawing, Fig. 1 shows a diagrammatic representation of a pneumatic conveying system according to the present invention wherein a drum drier designated generally as 10 may be rotated by any suitable prime mover, such as an electric motor (not shown). Drum 10 is adapted to be coated through part of its periphery with a solid material 11, which may be applied to the drum 10 by any suitable process, such as by simple contact, pressing, working or spraying. As the drum 10 is rotated in the direction shown by the arrow to work the material in its final stage, preparatory to packaging or storage, material 11 is removed from the drum by any suitable scraping means, such as by doctor blade means 12.

In order to pick up the dried material 11 removed from drum 10 by scraper means 12, a pick-up tube indicated generally as 13, which extends axially substantially throughout the length of the drum 10, is interconnected by conduit means 14 to a material-collecting means, cyclone separator 15, which in turn is connected through conduit means 16 to air pumping means, exhaust blower 17. Blower 17 is arranged to be driven by any conventional means, such as an electric motor (not shown). The lower end of cyclone separator 15 is preferably provided with a chute or funnel, in this example a canvas tube 18, to permit the filling of barrels, boxes, or other suitable containers with the dried material conveyed from the drying apparatus and precipitated or settled from the air stream in separator 15.

In Fig. 2 there is shown a preferred embodiment of the pick-up tube 13 with the scraper or doctor blade means 12 in cooperation with a drum drier 10 in a system such as that shown in Fig. 1.

Contrary to previous practice, pick-up tube 13 has a longitudinal opening which is arranged to cooperate with an axially extending portion of the surface of drum 10 so that the entire flow of air through tube 13 is in the axial direction. This is accomplished by maintaining the longitudinally extending edges of tube 13 in close contact with the surface of drum 10 so that only the ends of the tube are open. It will be apparent that the near end is interconnected to a duct system, such as conduit means 14, while the opposite end is open to the atmosphere so that the only opening to the system is through this open end.

In this embodiment pick-up tube 13 is provided with three supporting lugs 19 mounted at equally spaced points along the lower edge of the tube and adapted to pivot upon a rod 20, which in turn is supported by four lugs 23 mounted upon a section of angle iron 21 integrally connected to base member 22. Rod 20 with the lugs 19 upon the pick-up tube and lugs 23 supported by angle iron 21 provide a pivoting support for pick-up tube 13 so that the tube may be removed from contact with drum 10 for cleaning or inspection. To provide easy access to the pick-up tube, a handle 24 is mounted upon a pair of lugs 25 preferably welded to the upper portion of the pick-up tube 13. The upper longitudinal edge of pick-up tube 13 is adapted to form a sealing connection with the scraper means, or doctor blade means, 12, which comprises a holder 26, supported by any desired means, having a longitudinal slot 27 adapted to hold a doctor blade 28 so that blade 28 contacts the surface of drum 10. As shown, blade 28 is provided with a beveled portion 29 which may be of any desired angle, depending upon the composition and consistency of the material 11 to be removed from drum 10. It will be apparent that the cutting angle which blade 28 makes with drum 10 will be controlled by the angle that the holder 26 makes with the tangent to the drum at the point of contact and the angle of beveled portion 29 on blade 28.

To provide the maximum quantity of air flow longitudinally along the surface of drum 10, as mentioned above, it is desirable to maintain the clearance between the lower edge 30 of pick-up tube 13 and the layer of material 11 on drum 10 as close as possible. While this close clearance may be obtained by carefully machining and fitting the lower edge 30 of pick-up tube 13 to the surface of drum 10, we have found that a sealing means, such as flexible strip, or flap, 31 attached by means of rivets 32 to the lower edge of the pick-up tube will give the desired clearance without acting as an auxiliary scraping means and thereby removing material 11 from the drum 10. One material which we have found very satisfactory for this purpose is a rubber and fabric flap made of a pliable rubber and a soft canvas molded together.

As an example of a process wherein the present invention has been found to be superior to previously known methods of conveying, there is shown in Fig. 3 a schematic representation of pick-up tubes according to the present invention applied to the drying and conveying of detergent material, such as alkyl aryl sulfonates, where the material is supplied as an aqueous slurry by means of a slurry feed pipe 33. In this apparatus two drums 10 are driven in opposite directions with just sufficient clearance between the two drums to permit slurry 34 to be contained between the two rollers 10. The desired thickness of material to be dried on drums 10 is then deposited by adjustment of the gap between drums 10. It will be understood that sufficient heat is supplied through the drums 10 to dry material 11 before the material passes under the pick-up tube 13, so that material 11 is in the desired state of dryness prior to removal by scraper means 12. It will be apparent that the two pick-up tubes 13 may be manifolded together at the opposite end so that the material from both tubes may be connected to a system such as that shown in Fig. 1.

In operation the dried material 11 is deposited upon the drum 10 by any suitable means such as that shown in Fig. 3, or by spraying the material on the drum. The drum is then rotated until the material contacts blade 28 of stripping or scraping means 12. Simultaneously, air is drawn through the pick-up tube 13 by means of blower 17, conduit means 16, cyclone separator 15 and conduit means 14, so that all of the air in the system enters through the open end of the tube. In this way the maximum velocity is obtained at the extreme, or open, end of the tube 13. Since the carrying power of an air stream is dependent upon the cube of the velocity, a small drop in velocity of the air stream will greatly decrease the carrying power of the stream; hence it is desirable to obtain as great a velocity as possible at the open end of the tube so that the material scraped from the drum 10 adjacent the open end of tube 13 will be as readily carried as the material from the opposite end, which is connected to the evacuating system.

Where it is desirable to maintain uniform thickness or size of particles obtained from the pneumatic conveying system, such as in the conveying of alkyl aryl sulfonates, it has been found desirable to have a drop-out pot 35 adjacent the closed end of the pick-up tube 13 to permit large or lumpy particles to fall out of the normal air stream provided through tubing 14. It will be apparent that precipitation of the "fines," that is, too finely-divided particles, of such material may be separated from the system by any desired method, such as electrical or mechanical precipitation. Such precipitating apparatus may be interconnected with the cyclone separator 15, conduit means 16, or blower 17.

It will be apparent that the present invention provides a method and apparatus for more efficient and economically cheaper conveying of dried material by virtue of the pick-up tube being substantially parallel with the axis of the drum upon which material has been dried so that the maximum pick-up efficiency of the air is obtained by causing the air stream to flow longitudinally across the surface of drum 10.

It has been found in the production of certain types of detergents which are extremely irritating to the eyes and respiratory system that the present arrangement has proved to be the only satisfactory means of reducing the dust hazard to operating personnel inherent in the conveying of finely comminuted material by conventional conveying means. By virtue of the present system it is therefore possible to provide both a more efficient system for conveying and, at the same time, a dust-free atmosphere which makes it unnecessary to enclose such an operation to protect the health of workmen who maintain and operate the system.

While the above example is illustrative of one use for a conveying system according to the present invention, it will be understood that this conveying system is applicable to any drum-dried or drum-worked material.

By the arrangement of the disconnecting feature provided for pick-up tube 13 by lugs 19, rod 20 and lugs 23, it will be apparent that the drum 10 may be used in an operation where material 11 is successively worked by more than a single rotation on drum 10 prior to removal by scraper means 12. It will also be understood that if the material is sufficiently fragile after working to break away from the drum without scraping, scraping means 12 may be eliminated.

It will be apparent to those skilled in the art that further modifications and changes may be made in the present system without departing from the spirit and scope thereof. Accordingly, we intend to limit the invention only within the scope of the appended claim.

We claim:

A pneumatic conveying system for solid material deposited as a layer upon a rotatable drum, comprising a pick-up tube having only one end thereof open to the atmosphere and a pair of longitudinally extending edges forming an opening adapted to cooperate with the surface of said drum upon which said material has been deposited, sealing means between one of said edges and said drum to prevent admission of air to said tube therealong, means for stripping said material from said drum along the longitudinal opening in said tube, the other of said edges cooperating with said stripping means to prevent admission of air therebetween, conduit means between the opposite end of said tube and a material-collecting means and air-pumping means interconnected with said conduit means and said material-collecting means to provide a current of air flowing longitudinally across said drum for conveying said dried material from said drum to said material-collecting means.

EDGAR B. CHISWELL.
HAROLD W. GAUNCE.

REFERENCES CITED

The following references are of record in the file of this patent:

UNITED STATES PATENTS

| Number | Name | Date |
|---|---|---|
| 190,927 | Stoddard et al. | May 15, 1877 |
| 965,315 | Moorhead | July 26, 1910 |
| 2,307,995 | Davey | Jan. 12, 1943 |
| 2,352,200 | Overton | June 27, 1944 |